United States Patent Office 2,913,449
Patented Nov. 17, 1959

2,913,449

CONJOINT HALOGENATION TECHNIQUE

Fred D. Hoerger and Harry W. Smeal, Midland, Mich., assignors to The Dow Chemical Company, Midland, Mich., a corporation of Delaware No Drawing. Application January 18, 1957
Serial No. 634,840

14 Claims. (Cl. 260—94.9)

This invention relates to an improved conjoint halogenation technique for polyolefins. It bears special reference to a novel duplex procedure for halogenating polymers of ethylene, propylene, butylene and the like. The conjoint technique of the present invention is particularly adapted for employment to halogenate such polyolefin varieties and species as have essentially linear structures that are substantially free from significant content or occurrence of extensive side-chain networks and, advantageously, relatively high molecular weights, such as essentially linear and relatively unbranched polyethylene of the indicated variety. The invention also concerns the novel and distinctive halogenated, particularly chlorinated, polyolefins having inherent and peculiarly advantageous characteristics that may beneficially be provided by practice of the procedure.

Various methods are known for chlorinating and otherwise halogenating polyethylene and other polyolefins which have been conventionally prepared, for example, by polymerizing the monomeric olefin in the presence of polymerization-favoring quantities of oxygen and water having a pH greater than 7 under a pressure of at least 500 and, advantageously, 1000 atmospheres and at temperatures of from 150 to 275° C. The known methods for chlorinating polyethylene and other polyolefins prepared in this or an equivalent manner (which generally have extensively branched or side-chain network-containing molecular structures and seldom attain molecular weights in excess of about 40,000) usually involve the practice of catalyzing the reaction by illumination or chemical agents, such as azo type catalysts, while the polymer being chlorinated is maintained in an inert solvent or suspending medium. Frequently, such chlorinations are conducted under superatmospheric pressures.

Distinct species and varieties of polyethylene, polypropylene, polybutylene and other polyolefins, including copolymers of various hydrocarbon olefin monomers, are also available which have essentially linear and unbranched molecular structures that are relatively free from extensive side-chain networks. Such polyolefins may advantageously be prepared having apparent molecular weights (as would be indicated from observation of such of their intrinsic properties as melt viscosity and the like) in excess of 5,000 and, more advantageously, from at least 20,000 and usually from at least 40,000 to as much as 500,000 and 3,000,000 and greater. For example, as has been disclosed in Belgian Patent Number 533,362, such polymers may be prepared from ethylene and other olefins according to a process that first was proposed by Dr. Karl Ziegler and his associates in Germany. In this process, the polymerization is conducted under the influence of catalyst systems which comprise admixtures of strong reducing agents, such as aluminum alkyls, and compounds of group IV–B, V–B and VI–B metals of the periodic system, especially titanium and zirconium. Relatively low pressures ranging from 1 to 100 atmospheres may be employed with benefit when Ziegler catalyst systems are utilized for the polymerization of olefins. Other known processes for producing macromolecular polyolefins of such nature, particularly polyethylene, employ such materials for catalysts as chromium oxide on silicated alumina, hexavalent molybdenum compounds and charcoal supported nickel-cobalt. Belgian Patent Number 530,617 and Canadian Patent Number 502,597 are representative of other art that relates to the various macromolecular linear polyolefins, particularly polyethylene, that have recently become available.

The conventional methods for chlorinating or otherwise halogenating the conventional non-linear and branch structured, relatively low molecular weight polyolefins, particularly polyethylene, are not especially well suited for adaptation to the halogenation of essentially linear and relatively high molecular weight macromolecular polyolefins, particularly polyethylene, that are substantially devoid of extensive side-chain networks and which have many other distinctive and distinguishing characteristics. However, in two copending applications of Fred D. Hoerger and Elton K. Morris which were both filed on October 28, 1955 (having Serial Numbers 543,627 and 543,626) which respectively cover an improved process for halogenating polyolefins and a method for halogenating polyolefins, there are disclosed significant ameliorations for obviating the deficiencies of the known art in connection with the halogenation, especially the chlorination, of the indicated linear, macromolecular varieties of polyolefins.

Thus, according to the process of Hoerger and Morris which is disclosed in the initially mentioned application having Serial Number 543,627, linear and unbranched polyolefins may advantageously be chlorinated by subjecting them to the action of a chlorinating agent in the presence of a free-radical catalyst while the polymer being chlorinated is dissolved in a solvent liquid which is substantially inert to the chlorinating agent and while the chlorination is being conducted at a temperature which is at least about that required for the solvent liquid to dissolve about 1 percent by weight of the polymer and not in excess of a temperature that might induce substantial deleterious dehydrochlorination of the chlorinated polymer to occur. The chlorinated polyolefins prepared in accordance with such solution chlorinating technique, particularly chlorinated polyethylenes, usually have a more uniform distribution of the substituent chlorine atoms along the polymer molecule than may otherwise be readily obtained. Such chlorine distribution in an essentially linear and unbranched polyethylene, for example, may be such that less than three adjacent methylene groups may be found at any point in a polymer molecule containing at least about 40 percent by weight of combined chlorine. Schematically, such structural arrangement in a solution chlorinated polyethylene having a relatively high combined chlorine content may be represented in the following manner:

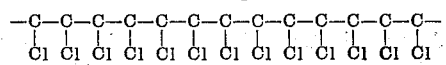

Products prepared in accordance with the solution chlorinating process of Hoerger and Morris that have the combined chlorine uniformly distributed in the indicated pattern tend to have greater elongations and elasticities than may be obtained in products chlorinated by other methods.

Alternatively, according to the other method of Hoerger and Morris which is disclosed in the subsequently mentioned application having Serial Number 543,626, various polyolefins including linear and unbranched polyolefins may also be halogenated with advantage by directly subjecting a finely divided or powdered free-flowing solid mass of the polyolefin to be halogenated to a halogen atmosphere while maintaining the finely divided mass in an agitated condition and at a suitable reacting temperature beneath the sintering temperature of the polymer. Polyethylene, for example, especially that having a relatively high molecular weight of from 40,000 to 500,000 and greater, and a melting point in the neighborhood of about 125–135° C. may advantageously be chlorinated according to the direct method of Hoerger and Morris by subjecting the agitated, free-flowing mass of polymer to an atmosphere of chlorine at a temperature between about room temperature and about 85° C. Halogenated polyolefins having any desired halogen content to as great as about 80 percent or more by weight can readily be prepared by the referred-to direct method.

The chlorinated and other halogenated polyolefins prepared in accordance with such direct halogenating technique, especially linear, macromolecular polyolefins and particularly essentially linear and unbranched polyethylene, usually have a more intermittent, non-statistical distribution of the type wherein the substituent halogen atoms, such as chlorine, are attached in block-like concentrations or groupings along the polymer molecule which are separated by substantially unsubstituted groupings of adjacent basic units, such as methylene, in the polymer chain. The block-like substituent halogen groupings occur at greater intervals than might be predictable merely by the laws of chance. Such distribution of substituent halogen in an essentially linear and unbranched polyethylene, for example, may be such that at least as many as four adjacent methylene groups may be found at random points in the polymer molecule. Schematically, such structural arrangement in a directly chlorinated linear polyethylene may be represented in the following manner:

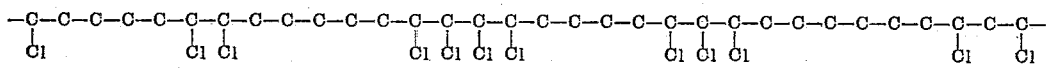

Products prepared in accordance with the direct halogenation method of Hoerger and Morris that have the intermittent, block-type distribution of combined halogen, such as chlorine, tend to have greater tensile strengths and rigidities than may be obtained in products halogenated by other methods.

It would be advantageous, and it is among the principal objectives of the invention, to provide hybridal halogenated, especially chlorinated polyolefin products, particularly linear macromolecular varieties and, even more particularly, essentially linear and unbranched polyethylene, that would have connubiated characteristics of both the uniform and the intermittent, block-type substituent halogen distribution in the polymer molecule that structurally, in essentially linear and unbranched chlorinated polyethylene, for example, might be represented in the following manner:

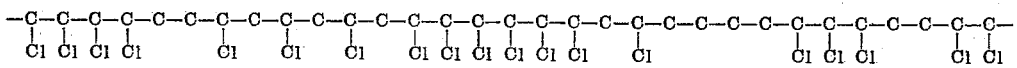

It would be particularly advantageous if such variety of halogenated polyolefin products, especially chlorinated polyethylene, would have highly desirable properties intermediate between those which are usually obtained in the diversely propertied products that may be respectively obtained by the indicated solution process and direct method of Hoerger and Morris. Thus, they would retain the beneficial elastomeric and elongatable features of the former solution halogenated products while retaining much of the beneficial tensile strength characteristics of the latter directly halogenated products.

These desiderations and numerous other advantages and benefits may be achieved by practice of the conjoint halogenation technique of the present invention which comprehends effecting the introduction of a portion of the total combined chlorine or other halogen content in a chlorinated or otherwise halogenated polyolefin (that advantageously may be a linear, macromolecular variety and, more advantageously, may be an essentially linear and unbranched halogenated polyethylene) by direct halogenation (in accordance with the direct method of Hoerger and Morris disclosed in the copending application having Serial Number 543,626) and effecting the introduction of the other portion of the total combined halogen content in the chlorinated or otherwise halogenated polyolefin by solution halogenation (which advantageously may be in accordance with the solution process of Hoerger and Morris disclosed in the copending application having Serial Number 543,627).

The halogenated, and particularly the chlorinated products of the present invention have felicific typical properties and characteristics which usually include good elastomeric propensities, generally satisfactory elongations and excellent tensile strengths. Although the properties of the various products that may be obtained by practice of the duplex halogenating procedure of the present invention are dependent and tend somewhat to be patterned after the properties attributable to the predominant type of substitution that is effected, they are not necessarily average or linearly proportionate values that are strictly predicatable on the percentage of combined chlorine or other halogen that has been attached during either the direct or the solution step of the total halogenation procedure. This point is further illustrated in the subsequent examples contained herein. In this connection, however, particularly desirable halogenated products, especially chlorinated products, may usually be prepared when the predominant proportion of the total combined halogen has been attached by block distribution-favoring direct halogenating techniques. Such products ordinarily are characterizable in having high tensile strengths and desirable, moderate degrees of elongatability. They also tend to have excellent high softening points. Products may be prepared by practice of the present invention that have more easily varied compatibility with plasticizers, wider ranges of softening points and greater variations in strengths and hardness properties than may be obtained when direct or solution halogenation techniques are independently employed.

Any desired content of combined halogen, from as little as 10 or less up to as much as 80 or more percent by weight, may be provided with advantage by practice of the invention. Polyolefins, particularly polyethylene, which contain between about 20 and 50 percent by weight of combined chlorine may be found to be especially utile and advantageously suited to satisfy the requirements of any of a wide variety of applications.

In many cases it may be most desired to employ chlorine as the halogen that is substituted in the polyolefin during both of the duplex halogenating steps in the practice of the invention. This is not only for reasons of the usually greater economy and availability of chlorine as a halogen, but also due to the excellent and exceptionally utilitarian characteristics of many chlorinated polyolefins, particularly polyethylenes. However the halogenation can also be satisfactorily accomplished with bromine in order to prepare brominated polyolefin products. Likewise many and various mixed halogenations can be accomplished in accordance with the present duplex procedure. Thus, chlorine may be employed in all or a portion of one of the halogenation steps and bromine in all or a portion of the other with part of either or both steps being performed, if desired, with both of the halogens in sequence. In this connection, fluorine may advantageously be utilized in the direct halogenation step (or in a portion thereof) in accordance with the referred-to disclosure of Hoerger and Morris in application Serial Number 543,626. Likewise, mixtures of halogens may be employed in either or both of the steps, including mixtures of chlorine and/or bromine with fluorine in the direct step. In this connection, and within the purview of the invention, the halogenation comprehends chlorosulfonation reactions and substitutions in order to prepare chlorosulfonated or partially chlorosulfonated products. Thus, the halogenation that is effected in either or both of the duplex steps or in portions thereof may consist of chlorosulfonation. As employed herein and in the hereto appended claims, however, the terms "halogen," "halogenation" and "halogenated" are intended to be exclusive of and not to include iodine, iodination or iodinated products.

The halogenation sequence, including the use of diverse halogens, in the conjoint technique of the present invention is relatively immaterial. Thus, either the direct chlorination or other halogenation or the solution chlorination or other halogenation may be first effected. If a partial fluorination is contemplated, however, the introduction of such halogen is preferably accomplished in the direct halogenating step in which event such step is best last performed in the duplex sequence. In the cases where the polymer to be halogenated is not readily available in a finely divided form it may be preferable to conduct the initial chlorination or other halogenation by solution techniques after which the partially chlorinated or otherwise halogenated intermediate can be isolated in a suitable finely divided form for the subsequent direct halogenation step. A partially solution halogenated polyolefin, particularly chlorinated polyethylene dissolved in carbon tetrachloride, can often be conveniently isolated as a finely divided intermediate by injecting its solution into a turbulently agitated aqueous solution of a methyl cellulose ether and then removing the solvent by steam distillation. When linear, macromolecular polyolefins are being halogenated, however, it is frequently more convenient to effect the suspension halogenating portion of the porcedure first. This is due to the fact that such polymers, particularly essentially linear and unbranched polyethylene, are frequently directly available after their polymerization in a finely divided, high-bulk, powder form having excellent particle size characteristics for a suspension chlorination.

As has been indicated, the solution chlorinating or other halogenating portion or step of the conjoint technique of the present invention may advantageously be in accordance with the above-identified solution process of Hoerger and Morris. Thus, a preferred operating temperature for a chlorinating reaction in a solution chlorinating step in the practice of the present invention is that at which about 5 percent by weight of the polyolefin is dissolved by the solvent liquid. Polyethylene, for example, having an essentially linear and unbranched molecular structure, a density of at least about 0.94 gram per cubic centimeter and, advantageously, a relatively high molecular weight may be partially solution chlorinated according to the present invention by passing chlorine through a solution containing about 5 percent by weight of the polymer in carbon tetrachloride or perchloroethylene at a temperature between about 110 and 130° C. and in the presence of a suitable free-radical catalyst.

In some instances it may be desirable to employ pressure for conducting the solution chlorinating or other halogenating step in order to minimize or overcome losses of the solvent liquid. At other times the employment of pressure may be a necessary expedient to obtain an advantageous concentration of the polyolefin to be halogenated. This may occur when temperatures which are in excess of the normal boiling point of the solvent must be employed to increase the solubility of the polymer. In this connection, it is a frequent experience to realize greater rates of reaction when superatmospheric pressures are employed.

The inert solvent liquids which may be employed for dissolving the polyolefins, particularly high molecular weight polyolefins, in the solution halogenating step are those which possess suitable solvent properties for the polymer and which are substantially resistant to reacting with the halogenating agent being employed. Thus, for example, such liquids as carbon tetrachloride, perchloroethylene, tetrachloroethane, pentachloroethane, perfluorocarbons, and fluorochloro carbons may be effectively employed. Some solvents which may be slightly reactive with free chlorine when it is employed as a halogenating agent, such as ortho-dichlorobenzene or chloroform, may, in certain instances, also be employed for chlorinations, though their utilization may be somewhat less desirable. Such solvents, because of their reactivity, tend to decrease the overall conversions which may be obtained with the halogenating agent in the reaction.

It is advantageous for the ratio of polymer to solvent employed in the solution halogenating step to be as large as the solubilities of the particular polyolefin being halogenated and the halogenated product permit. This avoids using unnecessarily large volumes of solvent in the reaction. Occasionally, when very high molecular weight polyolefins are being employed, it may be necessary to employ more dilute solutions to avoid difficulties in handling the viscous materials which may form at greater concentrations. As indicated, the dissolved polymer concentration in the solvent should be at least about 1 percent by weight with concentrations of at least about 5 percent by weight being even more beneficial. Regardless of the particular concentration used, it is important to have a complete solution of the polymer effected in the solvent in order for optimum results to be achieved during the solution halogenating step of the conjoint technique of the invention.

Most of the free-radical type of catalysts may be employed for the solution halogenating step of the present invention. When a free-radical type of catalyst is employed, the rate of reaction which is accomplished through the assistance of the catalyst will depend on such factors as the catalyst concentration, the temperature of the solvent media and the pH of the solution. Various azo type compounds and peroxides including ditertiarybutyl diperphthalate; tertiarybutyl perbenzoate; tertiarybutyl perphthalate; dicumyl peroxide; ditertiarybutyl peroxide; lauroyl peroxide; benzoyl peroxide; acetyl peroxide; cumene hydroperoxide; peracetic acid; hydrogen peroxide; diazodiisobutyronitrile; 2,4 - dichlorobenzoyl peroxide; methyl ethyl ketone peroxide and the like may advantageously be employed as catalysts. The free-radical catalysts selected from the group consisting of lauroyl peroxide; benzoyl peroxide; cumene hydroperoxide; ditertiarybutyl peroxide and diazodiisobutyronitrile are especially advantageously employed in the practice of the present invention. Preferably, the catalyst should be selected either to have an efficient rate of decomposition at the anticipated reaction temperature in order for it to function efficiently or it should be employed in such a manner that its efficient function is facilitated at such temperatures. In the following table are given the preferred temperature ranges in which the above-mentioned free-radical catalysts for the solution chlorinating step have efficient decomposition rates when dissolved in carbon tetrachloride or perchloroethylene:

TABLE I

*Temperatures of efficient decomposition in $CCl_4$ or $C_2Cl_4$ for free-radical catalysts*

| Catalyst: | Temp., °C. |
|---|---|
| Ditertiarybutyl diperphthalate | 100–110 |
| Tertiarybutyl perbenzoate | 100–110 |
| Tertiarybutyl perphthalate | 100–110 |
| Dicumyl peroxide | 105–115 |
| Ditertiarybutyl peroxide | 110–125 |
| Lauroyl peroxide | 60– 75 |
| Benzoyl peroxide | 70– 85 |
| Acetyl peroxide | 65– 80 |
| Cumene hydroperoxide | 95–105 |
| Peracetic acid | 80– 95 |
| Hydrogen peroxide | 80– 95 |
| Diazodiisobutyronitrile | 55– 70 |
| 2,4-dichlorobenzoyl peroxide | 55– 70 |
| Methyl ethyl ketone peroxide | 70– 85 |

The amount of catalyst which is employed in the solution halogenating step will depend on the rate of reaction which is desired. The manner of its employment will depend on the temperature of its efficient rate of decomposition. Thus, when the catalyst decomposes efficiently at about the anticipated temperature of reaction, a sufficient amount of it may be employed directly in the reaction mass. However, when catalysts are employed which decompose at temperatures below the anticipated temperature of reaction, it is advantageous to employ them in the reaction mass by adding them in small increments throughout the course of the reaction. This technique facilitates the efficient function of such catalysts at the temperature of the reaction. Since the rate of reaction during the solution halogenating step usually increases in proportion to the concentration of catalyst being employed, it is advantageous to use only as much catalyst as may be required to complete the solution halogenation reaction within a practical and desired time limit. Excesses of catalyst should be avoided, particularly near the termination of the solution halogenating reaction. Unused catalyst materials are frequently extremely difficult to remove from the solution halogenated product, hence it is desirable for substantially all of the catalyst employed to be thermally decomposed at the termination of the reaction. Generally, the concentration of catalyst which may advantageously be maintained in solution in the solution halogenating reaction mass will be between about 0.05 and 1.0 percent by weight, based on the weight of the dissolved polymer being halogenated. However, in certain instances higher catalyst concentrations may preferably be employed as, for example, when the polyolefin being halogenated has a relatively low reactivity or when the solvent employed exerts a chain stopping effect on the reaction. In addition, certain catalyst samples may display variations from their expected reactivity which may necessitate their being employed in amounts which are greater or lesser than anticipated.

As might be anticipated, illumination with actinic light may also be employed in many cases to effect catalysis during the solution halogenation step.

The optimum reaction time for the solution halogenation varies according to the extent of halogenation desired as well as with the temperature, pressure and catalyst concentration employed. Substantially quantitative yields, based on weight of the polymer to be chlorinated or otherwise halogenated, may be readily obtained. However, as indicated, when solvents having a slight reactivity with a halogenating agent (such as free, elemental chlorine) are employed, the conversion of the agent into the desired halogenated product may not be exactly quantitative. The attainment of quantitative yields in the solution halogenating step may often be facilitated by the practice of recycling techniques for unreacted portions of the halogenating agent and by conducting the reaction at more moderate rates.

After a polyolefinic material has been solution halogenated to a desired degree as the final step of the procedure it may be isolated for recovery in any of several ways. For example, precipitants may be employed to remove the halogenated polymer from solution after which it may be filtered, washed and dried to prepare it for subsequent use. Volatile precipitants, such as methanol, particularly when they are miscible with the halogenation solvent, may advantageously be employed to minimize difficulties in isolating and separating the product. If desired, however, immiscible precipitants may also be employed. Thus, water at a temperature from 80 to 100° C. may be used to isolate fully chlorinated polyethylene from carbon tetrachloride solution. This may be accomplished by injecting the solution into the hot water to flash off the carbon tetrachloride leaving the isolated polymer suspended in and filterable from the water. Alternatively, the solution of halogenated polyolefin may be cast as a film on a drum drier which is at a sufficient temperature to evaporate the solvent and permit recovery of the thereby isolated polymer product from the surface of the drier.

The direct halogenating portion or step of the conjoint technique of the invention may also, as indicated, be advantageously conducted or performed in accord with the previously identified direct method of Hoerger and Morris. Optionally, the reaction in the direct step of the procedure may also be accelerated by employing free-radical catalysts dispersed in the reaction mass or by conducting the reaction under a moderate pressure above atmospheric.

Preferably, as mentioned, the polyolefinic material to be halogenated in the direct step is employed in a finely divided form. Material having a particle size between about 15 and 400 mesh (U.S. sieve series) is preferably employed. Frequently, larger sized particles may also be utilized, provided they are in a free-flowing condition or can be rendered free-flowing by the influence of agitation or a like expedient. A material which is finely divided to particles having a size distribution or screen analysis which is commensurate with or equivalent to that of the powdered polyethylene samples as set forth in the following table may be suitably employed for purposes of the present invention.

TABLE II

*Screen analysis of suitably powdered polyethylene*

| Screen Mesh (U.S. Sieve Series) | Percent Retained on Screen of— | | |
|---|---|---|---|
| | Polymer "A" | Polymer "B" | Polymer "C" |
| 35 | 9.0 | 41.6 | 9.0 |
| 45 | 9.4 | 13.9 | 3.6 |
| 60 | 24.1 | 10.9 | 2.9 |
| 80 | 27.8 | 9.3 | 2.8 |
| 100 | 9.4 | 4.9 | 1.9 |
| 140 | 10.9 | 7.9 | 9.5 |
| 200 | 3.8 | 6.0 | 18.8 |
| 270 | 1.9 | 3.0 | 22.3 |
| 325 | 1.5 | 1.4 | 19.0 |
| 400 | 1.5 | 0.8 | 8.1 |
| pan | 0.8 | 0.2 | 1.9 |

As indicated, the finely divided and free-flowing mass is agitated or otherwise manipulated during the direct halogenation step to thoroughly expose it to the halogen atmosphere. Preferably, the halogen atmosphere is passed in a current or stream relative to the polymer mass to accomplish the reaction.

Various apparatus which are equipped with efficient agitating means may be employed to accomplish this in the direct halogenation step of the invention, including reactors having paddle agitators and the like and rotating cylinders which may be provided with internal mixing baffles and the like and which may be vertically or horizontally disposed, or may be inclined from the horizontal to facilitate a continuous interval passage of solid material therethrough during operation. Or, if desired, the material may be thoroughly exposed to the halogen atmosphere and effectively agitated by conducting the reaction in the direct halogenation step according to well known fluid bed techniques. When this is practiced, the current of halogen atmosphere is passed through a finely divided and free-flowing or fluidized bed or layer of the material to be halogenated. The passage or forcing of the halogen atmosphere through the fluid bed is done at a sufficient rate to accomplish a thorough agitation and exposure of the material being halogenated in the direct step. Any apparatus in which the free-flowing mass of polymer may be thoroughly subjected to the halogen atmosphere at the desired temperature may be suitably employed for conducting the reaction according to the method of the present invention.

Fluorine, chlorine and vaporized bromine, or mixtures of these and the like including mixtures of chlorine and sulfur dioxide, may advantageously be directly employed to constitute the halogen atmosphere in the direct step of the present invention. In certain instances it may be desirable for the halogen atmosphere to contain inert gases and vapors as diluents or carriers. This may permit a better control over the reaction, especially where highly reactive conditions, such as when fluorine is being employed, or when difficultly controllable temperatures may be expected. It may also provide for more efficient halogenation under certain circumstances, as where bromine is being employed in a fluid bed reaction. In some instances it may be advantageous to have only portions of the halogen atmosphere diluted when a continuous process is being employed to accomplish the direct halogenation step of the invention or to have it diluted only during particular intervals in a batch reaction. In this manner it is possible in the course of a particular direct halogenation step to adjust reaction conditions to suit the changing reactivity at various halogen contents of the polyolefin being halogenated during the direct step.

Any compatible gas or vapor which, under the reaction conditions, is inert to both the halogen atmosphere and the polyolefin being halogenated may be used as a halogen carrier to dilute the halogen atmosphere in the direct halogenating step. Helium and the inert gases, nitrogen, carbon dioxide, hydrogen halides, perchloro, perfluoro or fluoro-chloro hydrocarbons and steam and water vapor may be included among the suitable diluents which may be employed. Recycling of the hydrogen halide formed during the reaction will also frequently furnish a suitable means for diluting the halogen atmosphere. It may sometimes be desirable to externally cool the hydrogen halide formed during the reaction in the direct step when it is being recycled as a diluent. This may furnish an effective means for controlling the temperature of the reaction within a desired range. The employment of water vapor to dilute the halogen atmosphere may also be an especially effective means for providing closer control of the reaction temperature in the direct halogenating step of the invention.

In connection with this, neither the polymer nor the halogen atmosphere need be bone dry, or dry in the physiochemical sense. The presence of very small amounts of water or other inert liquids in the polymer may be beneficial in several respects. At times their presence may be useful to regulate the temperature by absorbing excessive heat through vaporization. In addition, small amounts of liquid in the polymer may also be useful to accelerate the reaction of the direct step by facilitating the absorption of halogen into the polymer. The amount of liquid contained in the polymer should not constitute a sufficient quantity, of course, to interfere with the free-flowing powder characteristics of the polymer.

The temperature below the sintering temperature of the polyolefin being halogenated during the direct step which is most suitable for the reaction will vary in individual cases with a variety of factors and conditions. Primarily it will be governed by the mutual reactivity of the particular polyolefin and halogen atmosphere which are being employed in the direct step and the extent of halogenation which is desired to be effected therein. The reactivity of the halogen atmosphere depends directly on the particular halogen or halogens which it contains and, further, on their effective concentration in the halogen atmosphere. The reactivity of the polymer being halogenated in the direct step is initially fixed by the character of the parent material, but may change in the course of a given reaction with a changing halogen content in the polymer being halogenated. The particle size or shape of the polymer being halogenated may also influence the reaction during the direct halogenation step since particles having greater surface areas, particularly smaller sized particles or those with crenulated or otherwise irregular configurations, tend to be more conducive to the reaction. The rate of reaction at any given temperature during the direct halogenation step of the invention is also dependent to a considerable extent on the rate of diffusion of the halogen from the halogen atmosphere into the polymer being halogenated and the capacity of the polymer at such temperature to absorb the particular halogen which is involved.

The optimum temperature for conducting the reaction during the direct step is usually the highest temperature which can safely be employed to obtain a desired rate of reaction without causing the polymer being halogenated to sinter, fuse or char. The upper permissible temperature limit for any reaction being conducted during the direct step in a controlled manner is frequently also a function of the cohesive characteristics of the particular polymer being employed and of the halogenated products being obtained during the reaction. The extent of the temperature range beneath the sintering temperature of the polymer which is being utilized in the direct step is generally predominantly governed by its mutual reactivity with the halogen atmosphere. Usually it falls within a range which is between about 5 and 10 centigrade degrees beneath the sintering temperature of the particular polyolefin which is involved in the halogenation. Thus, fluorinations may usually be conducted in the direct step within a range which is between about $-20°$ C. and about five centigrade degrees below the sintering temperature of the polyolefin, with higher operating temperatures within the said range usually being permissible in inverse relationship to the fluorine content of the halogen atmosphere. Chlorinations in the direct step according to the present invention can usually be accomplished in a range between about room temperature and about five centigrade degrees beneath the sintering temperature in air of the polymer being chlorinated although, particularly when higher chlorinated products are desired, it is more advantageous to operate in a temperature range between about 40° C. and about five centigrade degrees beneath the sintering temperature of the polyolefin being chlorinated. In this connection, a reaction temperature during the direct step of from about room temperature to about 85° C. is suitable for directly chlorinating essentially linear and unbranched polyethylene, especially when it has a relatively high molecular weight and a melting point in the neighborhood of about 125–135° C. However, in order to obtain higher chlorinated polyethylenes of this nature, especially products in which the desired chlorine content is greater than about 28 to 30 percent by weight, it is preferable to conduct the reaction during the direct step in an optimum operating range which falls between about 40° C. and about 85° C.

Brominations in the direct step are usually most advantageously conducted in a relatively narrow range of about 5 to 20 centigrade degrees beneath the sintering temperature of the polyolefin being halogenated.

Although the rate of direct halogenation increases with temperature, care should be taken to avoid higher temperatures which may sinter, fuse or char the polymer. When this occurs it becomes more difficult to keep the finely divided polymer in a proper state of agitation during the direct halogenating step and it may cause non-uniformity in the product. In addition, the halogenation reaction is seriously impeded in the direct step with a sintered polymer because of agglomeration or sticking together of the sintered particles and the relatively great reduction in exposed surface area which is thereby occasioned.

The optimum temperature of reaction in the direct step may vary in the course of a particular halogenation due to changes in the softening point of the polyolefin being halogenated at various combined halogen contents. The softening points of many chlorinated polyolefinic materials, for example, tend to first decrease slightly as compared to the parent polyolefin and then to increase as greater amounts of chlorine are combined in the polymer. In such cases it is usually advantageous, as mentioned, to alter the temperature of reaction throughout the direct halogenation so that an optimum temperature is constantly maintained at some desired point beneath the changing sintering temperature of the polymer being directly halogenated in the practice of the conjoint procedure of the invention.

The initial portions of the halogenation reactions in the direct halogenation step in the technique according to the present invention are usually strongly exothermic. For this reason, they may frequently be advantageously performed during the direct step at the lower extremities of the indicated suitable temperature ranges for the various halogen atmospheres which may be employed. After the occurence of the strongly exothermic initial portion of the reaction in the direct step, however, further direct halogenation at such lower temperatures may proceed at an undesirably low rate. For example, when solid polyethylene is being directly chlorinated at about room temperature, the rate of the reaction diminishes markedly to an undesirably low level after about ten percent of the available hydrogen in the parent polymer has been replaced. Advantage may frequently be taken of this phenomenon when lower halogenated products are involved or desired to be prepared or in order to effect a better control over the earlier and more vigorous stages of a direct halogenation step in which higher halogen containing products are being sought. A reaction may thus be initiated during the direct step with an unhalogenated polymer at as low a temperature as will provide a satisfactory halogenation rate. After the halogenation has proceeded to the point at which the exothermic nature of the reaction is not sufficiently pronounced to maintain a desired rate, increasing temperatures may be employed in correlation with the subsiding exothermic nature of the reaction to maintain the rate of the reaction during the direct step at the desired level, until an intermediate or final product containing the desired amount of combined halogen is obtained.

The direct halogenation step of the present invention may be conducted under any desired pressure. Advantageously, it may be carried out at atmospheric pressure although, if desired, superatmospheric pressures may also be employed to hasten the reaction during the direct step. The ratio of reactants employed is not critical in the direct halogenating step of the invention. Better results may often be obtained when the reaction is being conducted under atmospheric pressure by employing a halogen atmosphere which contains amounts of the halogen in excess of stoichiometric requirements. When the reaction is conducted under superatmospheric pressure during the direct step, care should be exercised to adequately vent the by-product materials which are formed in order to maintain an efficient halogen level in the halogen atmosphere.

After a polyolefinic material has been directly halogenated to a desired degree in the practice of the invention, it may frequently be placed in a more usable condition by being exposed to air or to a vacuum to remove any residual halogen atmosphere or gaseous by-products of the reaction that is involved in the direct step which may remain in the halogenated product. However, particularly when catalysts have been employed and the direct halogenating step is employed finally in the twofold sequence, it may be desirable to wash the halogenated product in water or other solvent and to dry it before subsequent usage.

The entire duplex halogenation procedure, or any desired part of it, may be carried out by batchwise or by continuous processing arrangements. For batch operations it is ordinarily suitable to employ conventional autoclaves, kettles, drums or the like for conducting the reaction, as may be best suited for either of the steps. However, it may also be conveniently conducted in a continuous process by any one of several suitable techniques. For example, it may be conducted by countercurrent movement of the reactants through either horizontally or vertically disposed reactors which may be in the form of tubes and towers or by using a cascading principle with a series of interconnected reaction chambers.

Substantially quantitative yields, based on the weight of the polymer to be chlorinated, may be frequently obtained by the duplex chlorinating procedure of the present invention. The attainment of such yields, as has been indicated, may often be facilitated for both steps of the conjoint technique by the practice of recycling techniques for unreacted portions of the halogenating agent and by conducting the involved reactions at more moderate rates.

In order to further illustrate the invention, but without being restricted thereto, the following examples are given wherein, unless otherwise indicated, all parts and percentages are to be taken by weight.

EXAMPLE I

About 536 grams of polyethylene in free-flowing powder form having an average particle size substantially between about 15 and 400 mesh (U.S. sieve series) was placed in a vertical glass column with a tapered bottom and fluidized with a stream of mixed chlorine and nitrogen that was passed upwardly through the column at a superficial velocity of about 0.76 feet per second. The column had a height of about six feet and an interior diameter (excepting for its bottom portion) of about three inches. The polyethylene was an essentially linear and unbranched macromolecular species that had been prepared under the influence of a Ziegler-type catalyst system. It had an average molecular weight of about 60,000 and a melting point of about 130° C. Its bulk density was about 6.1 pounds per cubic foot. The fluidizing gas mixture consisted of about 17.5 percent by volume of chlorine and 82.5 percent by volume of nitrogen which had been pre-heated to a temperature of about 70° C. The total fluidizing gas rate was about 137 cubic feet per hour.

The direct chlorination was continued for about six hours, during which time the average temperature in the fluidized reaction bed was observed to be about 43° C. At the termination of the direct chlorination step, the intermediate chlorinated polyethylene was found, by Parr bomb analysis, to contain about 28.4 percent of combined chlorine.

About 117 grams of the thus halogenated intermediate was dissolved in about 1750 milliliters of perchloroethylene at 115° C. and chlorinated at atmospheric pressure by sparging an excess of chlorine into the solution for about 1.5 hours, according to the procedure of application Serial Number 543,627, using benzoyl peroxide as a catalyst. The finally chlorinated polymer was isolated by precipitation from methanol. It was then washed several times with methanol and dried in a vacuum oven. The resulting chlorinated polyethylene was found, upon Parr bomb analysis to contain about 42 percent combined chlorine. The final product was molded into sheets with tensile strengths of about 2580 pounds per square inch (p.s.i.) and elongations of about 600 percent. The Tinius-Olsen flow viscosities (A.S.T.M. D569-48) of the resulting sheets was about 25 seconds per inch of flow at 180° C.

In contrast with the foregoing, the tensile strength and elongation of a similar halogenated polyethylene that contained about 41 percent of combined chlorine derived solely by a solution method of chlorination were about 1350 p.s.i. and 650 percent, respectively.

EXAMPLE II

The procedure of Example I was repeated excepting that only about 20 percent of combined chlorine was introduced in the polymer during the initial direct halogenation step of the duplex procedure. The final product contained about 43 percent of combined chlorine. It could be compression molded to give transparent sheets which tended to be slightly tacky. The chlorinated polyethylene product had a tensile strength of about 1500 p.s.i., an elongation of about 800 percent and a Tinius-Olsen flow viscosity at 180° C. of about 24 seconds per inch of flow.

EXAMPLE III

The procedure of Example I was repeated excepting to stop the second solution chlorinating step of the duplex procedure at the point where the total combined chlorine content was about 35 percent. The product was molded into transparent, flexible and somewhat elastic sheets which had tensile strengths of about 2900 p.s.i. and elongations of about 350 percent.

Additional comparison is available by evaluating the products of the foregoing three examples with the same properties for certain of the entirely suspension chlorinated and entirely directly chlorinated polyethylenes that have been discussed in the copending application Serial Number 543,295, filed October 28, 1955, for Chlorinated Polyethylene by Fred D. Hoerger and Elton K. Morris.

EXAMPLE IV

An intermediate chlorinated polyethylene product was prepared by the direct step set forth in the first example to obtain a polymer having about 25 percent of combined chlorine. About 185 grams of the intermediate was then dissolved in about 3500 milliliters of perchloroethylene at 110° C. About 160 grams of bromine was added to the hot solution over a two hour period with continued stirring and the agitated reaction mass was synthermally maintained for an additional eight hours. One gram per hour of di-t-butyl-peroxide was added to the reaction mass for catalyzation. After being isolated, the mixed halogen-containing final product was found to consist of about 7.35 percent of bromine in addition to the chlorine. It was light tan in color and was molded into flexible, elastic sheets that had tensile strengths of about 1400 p.s.i. and elongations of about 500 percent. Moldings from the final chlorinated and brominated product were much more elastic than were moldings from a brominated polymer that contained 25 percent of combined bromine as the sole halogen constituent.

EXAMPLE V

The direct halogenating step of Example I was repeated to prepare an intermediate halogenated polyethylene that contained about 20 percent of combined chlorine. The intermediate was then chlorosulfonated by passing an equimolar mixture of chlorine and sulfur dioxide through a 4 percent solution of the chlorinated polymer in perchloroethylene at 110° C. for 3 hours. After its isolation, the product contained about 26 percent of combined chlorine and 2.1 percent of combined sulfur, respectively. It was a rubbery and elastomeric type of material that could be molded into tough but tacky articles.

EXAMPLE VI

About 172 grams of chlorinated polyethylene that contained about 19 percent of combined chlorine and which had been prepared as an intermediate by the direct halogenating step of Example I was dissolved in about 3500 milliliters of perchloroethylene at about 100° C. It was then chlorosulfonated by passing equimolar quantities of chlorine and sulfur dioxide, in a mixture, into the hot solution for a period of about seven hours. About 0.5 gram quantities each of di-t-butyl-peroxide and $\alpha,\alpha'$-azobisisobutyronitrile were added at hourly intervals to the reaction mass in order to catalyze the reaction. After isolation, the chlorosulfonated polymer was found to contain about 62.2 percent of combined chlorine and 1.19 percent of combined sulfur.

Results that are analogous to the foregoing may be achieved when other total combined chlorine and other halogen contents and reverse sequences are effected and when other proportionate parts of the total chlorination or other halogenation are accomplished by variation in the individual chlorinating or other halogenating, including chlorosulfonating, steps. Similar results may also be obtained with the conventional more branch structured types of polyethylene and with other polyolefins, especially with the linear, macromolecular varieties, particularly polypropylene, polybutylene and the like.

The halogenated products, particularly chlorinated polyethylene, especially when it is the essentially linear and unbranched species with the indicated modified form of substituent halogen distribution, that are available by practice of the conjoint technique of the invention have a wide variety of uses and applications. Optimum utility, of course, may depend upon the nature of the polymer employed and the halogen content and distribution arrangement of the final product, as well as the particular combined halogen that is involved. For example, they may be spun into filaments and yarns for employment as textiles or may be made into films and other extruded forms and shapes for employment in packaging and other protective and decorative applications. Advantage may be taken of their flame resisting or fire retarding characteristics. They may also be employed in coatings or cast and molded into a variety of useful shapes having desirable properties and characteristics. Or, they may be prepared into expanded foam structures by the incorporation and release of suitable blowing agents and propellants in a known manner. In addition, they may often be advantageously blended with other types of polymeric materials to obtain improved and more desirable products for any of these uses.

As can be readily appreciated, the invention is subject to many changes and modifications that do not substantially depart from its intended spirit and scope. Hence, all of the foregoing is to be understood as being merely illustrative of that which is comprehended as falling within the present contribution to the art.

What is claimed is:

1. Conjoint halogenation technique for non-aromatic hydrocarbon polyolefins which consists essentially of a two step process for halogenating polyolefin polymers of non-aromatic hydrocarbon monoolefins of from 2 to 4 carbon atoms to a desired combined halogen content: one of which steps consists of directly halogenating said polyolefin to derive a portion of its total combined halogen content, said direct halogenation step being performed at a temperature between about −20° C. and the sintering temperature of the polymer by subjecting the olefin polymer as a powder mass of finely divided, free-flowing solid particles to a gaseous halogen atmosphere selected from the group consisting of those comprised of fluorine, chlorine, vaporized bromine, mixtures thereof and mixtures of chlorine and sulfur dioxide in said temperature range; the other step consisting of solution halogenating said polyolefin to derive the remaining portion of its total combined halogen content, said solution halogenation step being performed by subjecting said polyolefin to the action of a halogenating agent selected from the group consisting of chlorine, bromine, mixtures thereof and mixtures of chlorine and sulfur dioxide at a temperature which is at least about that required for the solvent liquid to dissolve about 1 percent by weight of said polyolefin and which is not in excess of that at which substantial deleterious dehydrohalogenation of the polymer occurs while said polyolefin is dissolved in a solvent liquid therefor which is substantially inert to said halogenating agent.

2. The technique of claim 1, wherein the direct halogenating step is accomplished while maintaining the mass of polymer in an agitated condition.

3. A technique according to claim 2, wherein the finely divided polyolefin is a powder having a particle size between about 15 and 400 mesh.

4. A technique according to claim 2, wherein the temperature at which the olefin polymer is directly subjected to the halogen atmosphere is from about 5 to 100 centigrade degrees beneath the sintering temperature of the polymer while maintaining the mass of polymer in an agitated condition.

5. A technique according to claim 1, wherein the polyolefin is subjected to the action of the halogenating agent under the influence of a free radical generating catalyst.

6. A technique according to claim 1, wherein the temperature is at least about that required for the solvent liquid to dissolve about 5 percent by weight of the polyolefin.

7. Chlorinating in accordance with the technique of claim 1.

8. Brominating in at least one of the steps in accordance with the technique of claim 1.

9. Chlorosulfonating in at least one of the steps in accordance with the technique of claim 1.

10. The technique of claim 1, wherein the direct halogenation step is initially effected.

11. The technique of claim 1, wherein the solution halogenation step is initially effected.

12. The technique of claim 1, wherein the preponderance of the desired total combined halogen content is derived by means of said direct halogenation step.

13. The technique of claim 1, wherein the polyolefin is of the linear, macromolecular variety.

14. The technique of claim 1, wherein the polyolefin is an essentially linear and unbranched species of polyethylene.

References Cited in the file of this patent

UNITED STATES PATENTS

| | | |
|---|---|---|
| 2,571,901 | Lawlor | Oct. 16, 1951 |

FOREIGN PATENTS

| | | |
|---|---|---|
| 623,705 | Great Britain | May 20, 1949 |
| 533,362 | Belgium | May 16, 1955 |

OTHER REFERENCES

Renfrew et al.: "Polythene," Iliffe and Sons Ltd., London (1957), pages 267–73.